US005729593A

United States Patent [19]
Baker et al.

[11] Patent Number: 5,729,593
[45] Date of Patent: Mar. 17, 1998

[54] ANNOUCEMENT SYSTEM AND METHOD IN A TELEPHONE CALL SWITCHING SYSTEM

[75] Inventors: Daniel F. Baker, Rolling Meadows; Noreen A. Harrington, Naperville; Paul E. Van Berkum, Winfield, all of Ill.

[73] Assignee: Rockwell International Corporation, Costa Mesa, Calif.

[21] Appl. No.: 689,472

[22] Filed: Aug. 8, 1996

[51] Int. Cl.[6] .................................. H04M 3/50
[52] U.S. Cl. .................. 379/67; 379/213; 379/218; 379/266
[58] Field of Search .................. 379/88, 89, 67, 379/210, 213, 214, 212, 201, 265, 266, 218

[56] References Cited

U.S. PATENT DOCUMENTS

| | | | |
|---|---|---|---|
| 4,697,282 | 9/1987 | Winter et al. | 379/67 |
| 4,734,930 | 3/1988 | Quiros et al. | 379/88 |
| 4,866,756 | 9/1989 | Crane et al. | 379/88 |
| 4,918,322 | 4/1990 | Winter et al. | 379/88 |
| 5,027,384 | 6/1991 | Morganstein | 379/67 |
| 5,255,305 | 10/1993 | Sattar | 379/34 |

OTHER PUBLICATIONS

"ISDN: The Technology Has Discovered It Purpose", David Matheson, *Telemarketing*, May 1990, pages 44–47.
*Voice Technology*, E.R. Teja and G. Gormella, pp. 91–97, Reston Publishing Co., Inc., Reston, VA., 1983.

Primary Examiner—Thomas W. Brown
Attorney, Agent, or Firm—Welsh & Katz, Ltd.

[57] ABSTRACT

An announcement system 100 and method is provided which plays announcements recorded in the voice of an agent servicing a call routed by a telephonic switch 106 at substantially any time during the call. A call information circuit 136 detects information relating to the call, such as DNIS and ANI. This information is transmitted to a computer terminal 110 at which the agent is stationed and logged on. A CPU 120 may automatically select and play an announcement stored in a memory circuit 124 based on this information. Further, the agent may select and play an announcement at substantially anytime via an input device 112. The CPU 120 may select a particular announcement to play based on the time of day (morning, afternoon or evening) determined from a clock 130. An administrator system 128 permits an administrator to control the recording, storing and playing of announcements. In particular, the announcements may be stored in a remote storage medium 126 and downloaded to the memory circuit 124 when the agent logs in to the computer terminal 110. The administrator may draft scripts via a script circuit 132 which are read by the agent. The scripts are displayed to the agent via a script viewer 134.

22 Claims, 1 Drawing Sheet

ANNOUCEMENT SYSTEM AND METHOD IN A TELEPHONE CALL SWITCHING SYSTEM

BACKGROUND OF THE INVENTION

The present invention is generally related to announcement systems associated with telephonic switching systems which play recorded announcements to incoming telephone calls and, more particularly, to an announcement system and method wherein recorded announcements are played to an incoming telephone call in a voice of an agent who services the call, wherein the announcements may be played at substantially anytime during the incoming telephone call and wherein the announcements are automatically selected based on the time of day the incoming telephone call is received.

Telephonic switching systems are being increasingly used by businesses to route incoming telephone calls from callers. To foster caller satisfaction, these business are continually searching for improved methods for assuring prompt and complete servicing of the calls. A further, and almost paradoxical, concern of a business is the happiness and productivity of the agents servicing the calls.

Consequently, various announcements systems have been designed to automatically playback recorded messages to the caller at the beginning (preannouncement messages) and the end (postannouncement messages) of an incoming telephone call. The agents are thus relieved of repetitively speaking a scripted greeting or closing. This improves the working conditions of the agent and helps increase agent morale.

Callers however may be disappointed to have their calls answered by a mechanical-sounding prerecorded response or in a voice different from the voice of the agent who services the call. Consequently, announcement systems are known wherein the voice of the recorded announcement is the voice of the agent who services the call. Although an advance in the art, these prior pre- and postannouncement systems are somewhat limited.

For example, greetings (or preannouncements) may be dependent upon the time of day a call is received. The message should read "Good morning . . . " in the morning, "Good afternoon . . . " in the afternoon and "Good evening . . . " in the evening. Unfortunately, prior systems do not automatically play the proper preannouncement based on the time of day.

Additionally, known systems do not permit announcements to be automatically selected and played at substantially anytime during the incoming telephone call.

Accordingly, there is a need in the art for an announcement system and method which plays announcements at substantially any time during an incoming telephone call in the voice of the agent servicing the incoming telephone call and which automatically selects and plays particular announcements based on the time of day.

SUMMARY OF THE INVENTION

This need is satisfied by an announcement system and method in accordance with the present invention wherein announcements are played to a caller in the voice of an agent servicing the call, wherein the announcements are played at substantially any time during the call and wherein the announcements are played based on the time of day.

In accordance with one aspect of the present invention, an announcement system for playing recorded announcements during an incoming telephone call serviced by an agent is provided. The announcement system comprising a recording device for recording announcements in a voice of the agent. A storage device stores the announcements and a selection circuit selects one of the announcements. A playback system plays the selected one of the announcements in the voice of the agent at substantially any time during the incoming telephone call.

Preferably, automatic selection means automatically selects which one of the announcements to play during the incoming telephone call. The announcement system may comprise a timing circuit for determining a time of day and the automatic selection means automatically selects the one of the announcements based on the time of day. Preferably, automatic selection means comprises means for automatically selecting the one of the announcements based on whether the incoming telephone call is received in the morning, afternoon or evening.

In accordance with another aspect of the present invention, a method for playing recorded announcements during an incoming telephone call routed to an agent is provided. The method comprising the steps of: recording announcements in a voice of an agent; storing the announcements; selecting one of the announcements; and playing the selected one of the announcements in the voice of the agent substantially any time during the incoming telephone call.

These and other features and advantages of the present invention will become apparent from the following detailed description, the accompanying drawings and the appended claims.

DETAILED DESCRIPTION OF THE INVENTION

Figure 1:
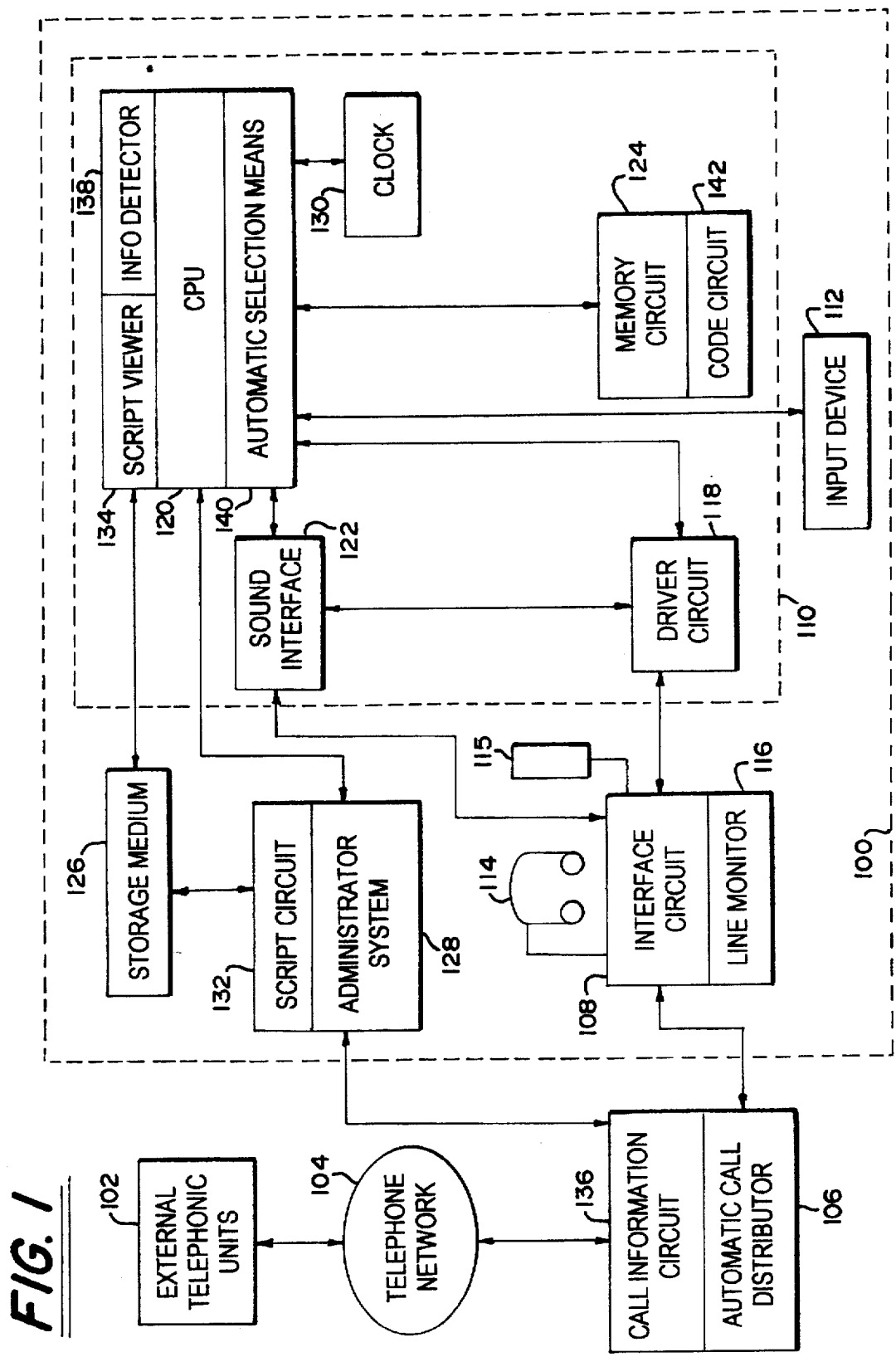
FIG. 1 is a schematic block diagram of an announcement system in accordance with the present invention.

An announcement system 100 for playing recorded announcements in the voice of a particular agent during incoming telephone calls received from external telephonic units 102 via a telephone network 104 in accordance with the present invention is shown in FIG. 1. The incoming telephone calls are routed by a telephonic switch, shown as an automatic call distributor (ACD) 106, to an agent station comprised of an interface circuit 108 and an agent computer. The agent computer comprises a computer terminal 110 communicating with an input device 112, such as a keyboard, a mouse and the like.

The interface circuit 108 transmits the caller's audio communications to a headset 114 worn by an agent at the agent computer. The agent's audio communications are transmitted from a microphone 115 to the interface circuit 108. A line monitor 116 detects the receipt of an incoming telephone call at the interface circuit 108. In response, the line monitor 116 notifies a driver circuit 118 in the computer terminal 110 that a call has been received. The line monitor 116 further detects when the telephone call is terminated.

The driver circuit 118 then sends the appropriate signals to a central processing unit (CPU) 120 and a sound interface 122 requesting that the appropriate message be played. After the agent logs in at the agent computer, prerecorded messages for the agent will typically be downloaded and stored in a memory circuit 124. Each agent will have a particular agent ID, or other distinguishing identification procedure, so that previously recorded messages can be associated with the correct agent. The agent logs in at the agent computer with a unique agent ID via the input device 112. Thereafter, all of the components of the system 100 would be able to identify which agent is at the agent computer. For clarity the following discussion will be directed to a single agent which it is assumed has completed the proper log in procedure. Those skilled in the art will readily understand that any number of agents located at one or more agent computers may be utilized in the present invention.

The messages (or announcements) are preferably stored in a storage medium 126 remote from the computer terminal 110 and then downloaded to the memory circuit 124 and/or the CPU 120 when the agent signs in at the computer terminal 110. Preferably, the memory circuit 124 and the storage medium 126 comprise an electronic storage medium for storing the announcements in digital format. In particular, a code circuit 142 for storing the announcements in pulse code modulated format may be advantageously utilized in the present invention. The microphone 115, the sound interface 122, the CPU 120, the memory circuit 124, the storage medium 126 and the like comprise a recording device for recording announcements in the voice of the agent. Similarly, the CPU 120, the storage medium 126 and the memory circuit 124 comprise a storage device for storing the announcements.

An administrator, or supervisor, selects and modifies default characteristics and controls the system 100 through an administrator system 128. For example, the administrator may draft scripts which are displayed to agents when recording announcements via an administrator script circuit 132. The scripts are displayed by a script viewer 134 to the agent for the agent to read when recording announcements. The administrator may select which announcements are to be recorded by which agents. Those skilled in the art will readily comprehend that a host of other functions may be performed by the administrator.

Information arriving with the incoming telephone call, such as digital network identification services (DNIS) information, automatic number identification (ANI) information, information provided by the caller and the like, is detected at the ACD 106 by a call information circuit 136. The call information circuit 136 may comprise means for detecting DNIS information. The information is then provided to the administrator system 128 and the computer terminal 110. An information detector 138 in conjunction with the administrator system 128 may automatically select an announcement, such as a preannouncement or postannouncement, to be played based on the detected information. In addition, a default announcement may be selected to be played if no DNIS or ANI is provided with the call. The structure, control and arrangement of these components and circuits have, for the most part, been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. As those skilled in the art will readily understand, the administrator system 128 may comprise various combinations of electronic/computer devices for interfacing with the ACD 106, the storage medium 126 and the CPU 120 and the like.

In operation the announcement system 100 of the present invention provides announcements played in the voice of the agent handling the call either automatically or on demand. To play an announcement on demand, the agent may select one of the stored announcements for playback through a selection circuit comprising the input device 112 and the computer terminal 110. In particular, the agent selects an announcement via the input device 112. The CPU 120 recognizes the agent selection and plays the appropriate announcement through the sound interface 122 and the interface circuit 108 to the caller. Further, the agent may select one of the announcements at any time during the call. These devices comprise a playback system for playing the selected one of the announcements at substantially any time during the call.

During the call, the CPU 120, or more particularly automatic selection means 140, may automatically initiate the playing of an announcement when a preselected action occurs. The automatic playing of an announcement may be based upon the information (such as DNIS) received with the call. The present invention may automatically play one of the announcements upon receipt, or beginning, of a call. The playback system would play an appropriate announcement, commonly called a preannouncement, upon notification from the line monitor 116 that a call has been received. The information received with the call may be used to select one of the announcements.

Further, the announcement being played may be dependent upon the time of day. A timing circuit, shown generically as a clock 130, determines the time of day. This information is then used by the automatic selection means 140 to select the appropriate announcement. For example, announcements may be stored for calls received in the morning, afternoon or evening. The announcements may say "Good morning . . . ", "Good afternoon . . . " and "Good evening . . . ". Depending on when the call is received, a particular message would be played. The CPU 120 detects when the call is received (via the line monitor 116) and selects the appropriate announcement. The CPU 120 may automatically determine the time of day based on the clock 130. The playback system, or in particular the CPU 120, terminates any announcement currently playing upon notification from the line monitor 116 that the telephone call has ended.

As those skilled in the art will readily appreciate, the administrator may enter scripts in one or more desired languages. For example, some agents may be speaking Spanish. Therefore, scripts displayed to these agents would be written in Spanish.

Having thus described the invention in detail by way of reference to preferred embodiments thereof, it will be apparent that other modifications and variations are possible without departing from the scope of the invention defined in the appended claims. For example, the administrator system 128 may have design configurations which depart from those described herein. Therefore, the spirit and scope of the appended claims should not be limited to the description of the preferred versions contained herein.

What is claimed is:

1. An announcement system coupled to an automatic call distributor for playing recorded announcements during an incoming telephone call received from a public switch telephone network and routed by a telephonic switch of the automatic call distributor to an agent, the announcement system comprising:

an interface circuit which receives the incoming call from the telephonic switch of the automatic call distributor and couples an audio portion of the incoming call to the agent;

an administrator system which receives call data about the incoming call through a separate connection with the telephonic switch; and a personal computer coupled to the interface circuit and administrator system which couples a selected announcement of a plurality of recorded announcements stored within the personal computer to the incoming call based upon an announcement selection message transferred from one of the agent and administrator system, such personal computer further comprising:

a recording device for recording the plurality of announcements in a voice of the agent;

a storage device for storing the plurality of announcements within the personal computer;

a selection circuit for selecting one of the announcements based upon the announcement selection message; and a playback system for playing the selected one of the announcements in the voice of the agent through the interface circuit from a driver circuit within the personal computer at substantially any time during the incoming telephone call.

2. The announcement system as recited in claim 1 wherein the selection circuit comprises means for selecting one of the announcements at substantially any time during the incoming telephone call.

3. The announcement system as recited in claim 1 wherein the selection circuit comprises:

automatic selection means for automatically selecting which one of the announcements to play during the incoming telephone call.

4. The announcement system as recited in claim 3 wherein the automatic selection means comprises means for detecting dialed number identification service information relating to the incoming telephone call, and wherein the automatic selection means automatically selects which one of the announcements to play based on the dialed number identification service information.

5. The announcement system as recited in claim 3 comprising:

a timing circuit for determining a time of day; and wherein, the automatic selection means automatically selects the one of the announcements based on the time of day.

6. The announcement system as recited in claim 5 wherein the automatic selection means comprises:

means for automatically selecting the one of the announcements based on whether the incoming telephone call is received in the morning, afternoon or evening.

7. The announcement system as recited in claim 1 wherein the storage device comprises:

a code circuit for storing the announcements in pulse code modulated format.

8. The announcement system as recited in claim 1 comprising:

a line monitor for detecting when the incoming telephone call is terminated; and wherein the playback system automatically terminates playing the one of the announcements when the incoming telephone call is terminated.

9. The announcement system as recited in claim 1 wherein the recording device comprises:

a script system for selecting and displaying scripts to the agent for the agent to follow when recording the announcements.

10. The announcement system as recited in claim 1 wherein the playback system comprises:

means for automatically playing one of the announcements at the beginning of the incoming telephone call.

11. The announcement system as recited in claim 10 wherein the playback system comprises:

means for detecting information relating to the incoming telephone call; and wherein the playback system plays the one of the announcements based on the information.

12. A method for playing recorded announcements during an incoming telephone call routed by a telephonic switch of an automatic call distributor to an agent comprising the steps of:

recording announcements in a voice of an agent from a script dictated through an administrator system and displayed on a screen of a personal computer used by the agent;

storing the announcements in a memory of the personal computer;

selecting one of the announcements based upon announcement selection data forwarded to the personal computer from one of an agent's keyboard and the administrator system; and playing the selected one of the announcements in the voice of the agent substantially any time during the incoming telephone call.

13. The method as recited in claim 12 wherein the step of storing the announcements comprises the step of storing the announcements in a digital format.

14. The method as recited in claim 13 wherein the step of storing the announcements comprises the step of storing the announcements in pulse code modulated format.

15. The method as recited in claim 12 wherein the step of selecting one of the announcements comprises the steps of:

detecting a time of day; and selecting the one of the announcements based on the time of day.

16. The method as recited in claim 15 wherein the step of detecting the time of day comprises the step of determining whether the time of day is morning, afternoon or evening.

17. The method as recited in claim 12 wherein the step of selecting one of the announcements comprises the step of selecting by the agent one of the announcements to be played.

18. The method as recited in claim 12 wherein the step of selecting one of the announcements comprises the step of automatically selecting one of the announcements upon receipt of the incoming telephone call by the agent based on information relating to the incoming telephone call.

19. An announcement system coupled to an automatic call distributor for playing recorded announcements during an incoming telephone call received from a public switch telephone network and routed by a telephonic switch of the automatic call distributor to the agent, such announcement system comprising:

an interface circuit which receives the incoming call from the telephone switch of the automatic call distributor and couples an audio portion of the incoming call to the agent;

an administrator system which receives call data about the incoming call through a separate connection with the telephonic switch; and a personal computer coupled to the interface circuit and administrator system which couples a recorded announcement of a plurality of recorded announcements stored in the personal computer to the incoming call through the interface circuit based upon an announcement selection message from one of the agent and administrator system.

20. The announcement system as in claim 19 further comprising a keyboard for entry of an announcement selection message by the agent.

21. The announcement system as in claim 19 wherein the administrator system further comprises a decoder which decodes DNIS information from the call data transferred from the public switch telephone network.

22. The announcement system as in claim 21 further comprising an announcement selection processor within the personal computer which selects an announcement based upon one of the DNIS data transferred from the decoder of the administrator system and the keyboard.

* * * * *